(12) United States Patent
Iwamoto et al.

(10) Patent No.: US 8,415,816 B2
(45) Date of Patent: Apr. 9, 2013

(54) VEHICLE AC GENERATOR

(75) Inventors: Kazuyuki Iwamoto, Minato-ku (JP); Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 549 days.

(21) Appl. No.: 12/759,215

(22) Filed: Apr. 13, 2010

(65) Prior Publication Data

US 2011/0148366 A1    Jun. 23, 2011

(30) Foreign Application Priority Data

Dec. 21, 2009   (JP) .................................. 2009-289369

(51) Int. Cl.
*F02N 11/04* (2006.01)
*F03B 63/00* (2006.01)

(52) U.S. Cl.
USPC ............................. 290/31; 290/38 R; 322/28

(58) Field of Classification Search .................... 290/31, 290/32, 36 R, 38 R; 322/28, 37
See application file for complete search history.

(56) References Cited

U.S. PATENT DOCUMENTS

| | | | |
|---|---|---|---|
| 5,686,780 A | 11/1997 | Adachi et al. | |
| 6,002,219 A * | 12/1999 | Permuy | 318/139 |
| 7,221,127 B2 * | 5/2007 | Masson et al. | 322/28 |
| 7,265,463 B2 * | 9/2007 | Kusase et al. | 310/62 |
| 7,362,001 B2 * | 4/2008 | Kusumi | 290/31 |
| 7,402,916 B2 * | 7/2008 | Taspinar et al. | 290/22 |
| 7,541,685 B2 * | 6/2009 | Ooiwa | 290/31 |
| 8,076,895 B2 * | 12/2011 | Rouis | 318/721 |
| 2003/0038482 A1 * | 2/2003 | Dubus et al. | 290/36 R |
| 2006/0279086 A1 * | 12/2006 | Kishibata et al. | 290/31 |
| 2007/0057511 A1 * | 3/2007 | Taspinar et al. | 290/22 |
| 2007/0102931 A1 * | 5/2007 | Oohashi | 290/30 R |

FOREIGN PATENT DOCUMENTS

| | | |
|---|---|---|
| JP | 54-164411 U | 11/1979 |
| JP | 58-59365 U | 4/1983 |
| JP | 05-219704 A | 8/1993 |
| JP | 3571790 B2 | 9/1996 |
| JP | 2001-16829 A | 1/2001 |
| JP | 2006-048930 A1 | 5/2006 |

* cited by examiner

*Primary Examiner* — Nicholas Ponomarenko
(74) *Attorney, Agent, or Firm* — Sughrue Mion, PLLC

(57) ABSTRACT

Provided is a vehicle AC generator for improving working efficiency in assembly, allowing a reduction in the number of components, and the like. The vehicle AC generator includes: a rectifier for rectifying an AC generated by a stator coil into a DC; and a regulator for regulating an AC voltage generated by the stator coil, in which: the regulator includes: a regulator holder; a regulator main body provided inside the regulator holder, the regulator main body being for regulating the AC voltage; a capacitor provided inside the regulator holder, the capacitor being for absorbing a noise generated when the AC is rectified into the DC by the rectifier; and an insulating resin material filling the regulator holder so as to fix the regulator main body and the capacitor.

6 Claims, 10 Drawing Sheets

VEHICLE AC GENERATOR

BACKGROUND OF THE INVENTION

1. Field of the Invention

The present invention relates to a vehicle AC generator including a rectifier for rectifying an AC generated by a stator coil into a DC and a regulator for regulating an AC voltage generated by the stator coil.

2. Description of the Related Art

Conventionally, the following vehicle AC generator is known. The vehicle AC generator includes a regulator case and a capacitor case. The regulator case houses a regulator board for voltage regulation therein. The capacitor case is superposed on an opening of the regulator case in a planar manner and houses a capacitor element therein. The capacitor case and the regulator case are both fixed to a bracket by using bolts (for example, see JP 05-219704 A).

However, the vehicle AC generator having the aforementioned structure has the following problems. The capacitor case is superposed on the regulator case while bolt through-holes of the capacitor case and the regulator case are brought into alignment. Then, the bolts are caused to pass through the plurality of bolt through-holes being in alignment to screw the regulator case and the capacitor case together in an integrated manner. Therefore, an assembly operation becomes disadvantageously complicated.

Moreover, two components, that is, the regulator case and the capacitor case, are required. Therefore, the number of components is correspondingly increased.

In addition, in the conventional vehicle AC generator, the capacitor case is filled with an epoxy resin which is then solidified, thereby firmly fixing the capacitor element in the capacitor case. For each of electronic components exposed on the regulator board inside the regulator case, however, for example, a welded portion of a terminal of an electronic component is likely to be damaged due to a vibration or the like.

SUMMARY OF THE INVENTION

The present invention has been made to solve the problems described above, and has an object to provide a vehicle AC generator for improving working efficiency in assembly and allowing a reduction in the number of components, which includes a regulator with improved reliability obtained by protecting a regulator main body and a capacitor with an insulating resin material.

According to the present invention includes:
a rectifier for rectifying an AC generated by a stator coil into a DC; and
a regulator for regulating an AC voltage generated by the stator coil,
wherein the regulator includes:
 a regulator holder;
 a regulator main body provided inside the regulator holder, the regulator main body being for regulating the AC voltage;
 a capacitor provided inside the regulator holder, the capacitor being for absorbing a noise generated when the AC is rectified into the DC by the rectifier; and
 an insulating resin material filling the regulator holder so as to fix the regulator main body and the capacitor.

According to the vehicle AC generator of the present invention, the regulator main body and the capacitor are fixed inside the regulator holder with the insulating resin material to be housed therein. As a result, the working efficiency in assembly is improved, while the number of components can be reduced. Further, the reliability of the regulator main body and the capacitor is improved.

DETAILED DESCRIPTION OF THE PREFERRED EMBODIMENTS

Hereinafter, embodiments of the present invention are described referring to the accompanying drawings. In each of the drawings, the same or equivalent parts and components are denoted by the same reference symbols.

First Embodiment

Figure 1:
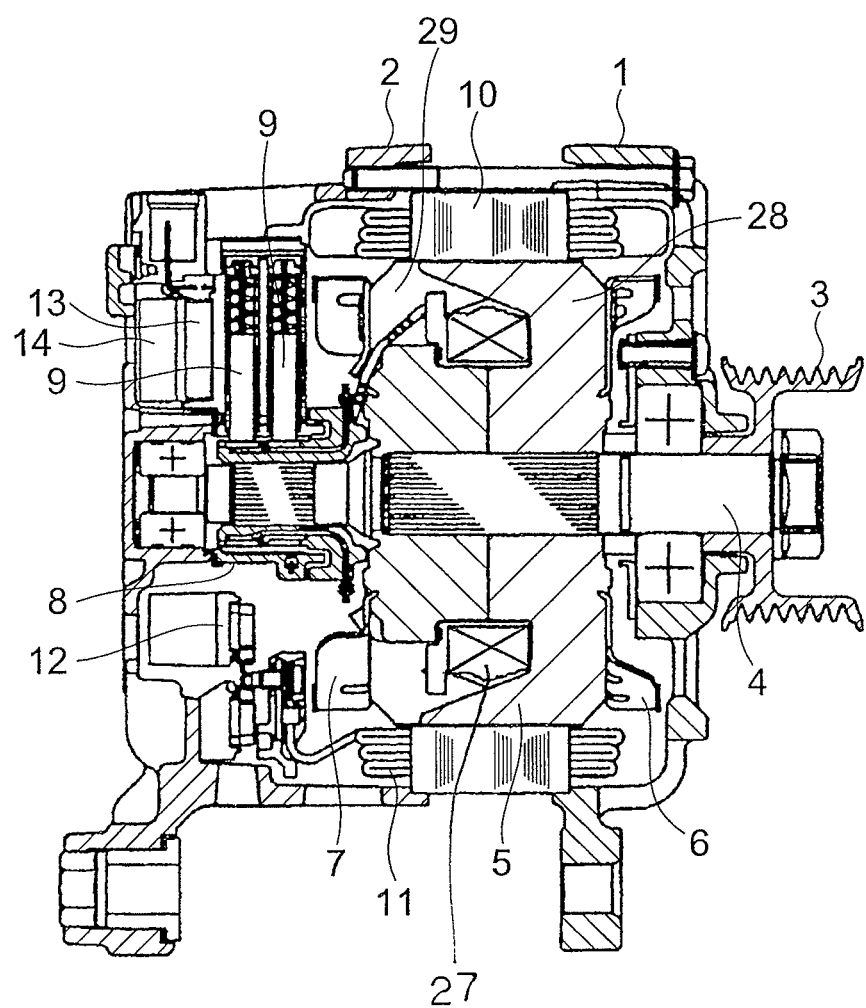
FIG. 1 is a sectional side view illustrating a vehicle AC generator according to a first embodiment of the present invention.
Figure 2:
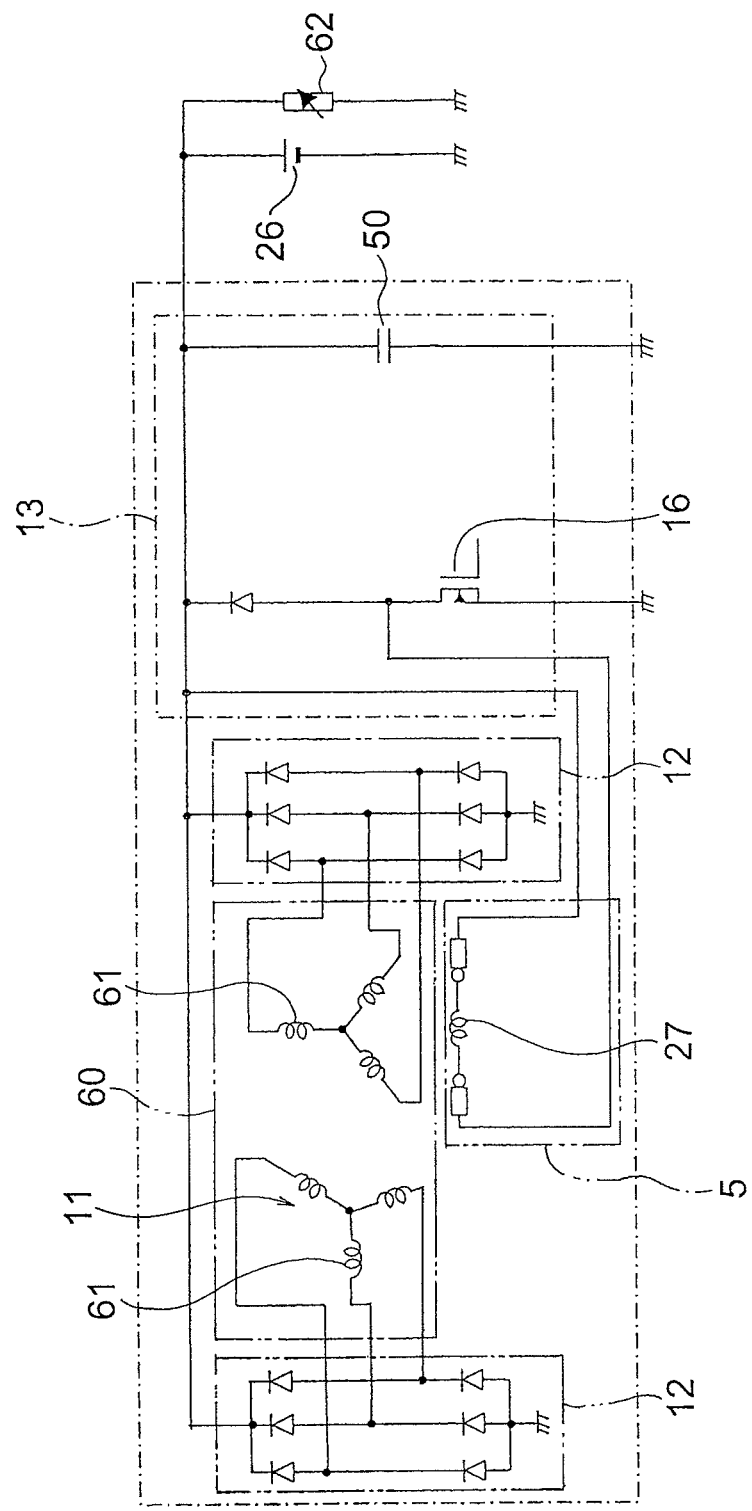
FIG. 2 is an electric circuit diagram illustrating the vehicle AC generator of FIG. 1.
Figure 3:
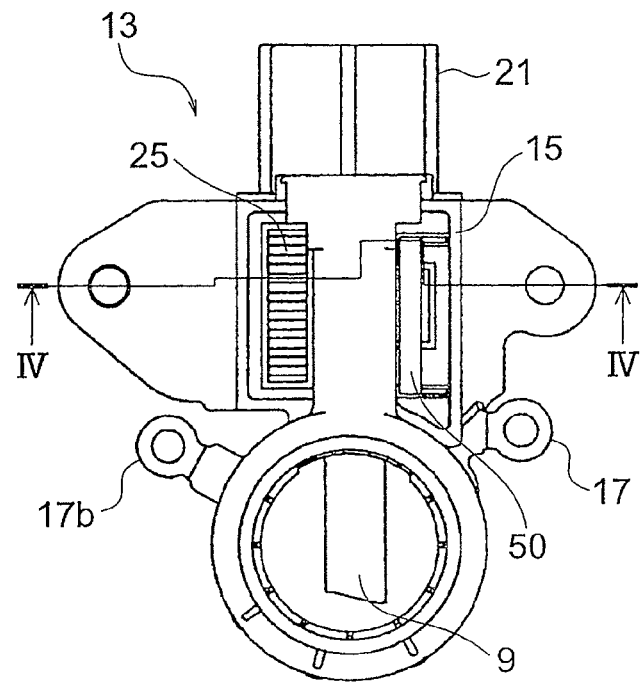
FIG. 3 is a front view illustrating a regulator of FIG. 1 (insulating resin material is omitted here)
Figure 4:
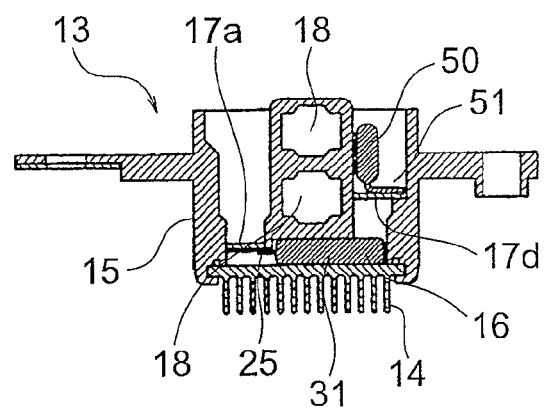
FIG. 4 is a sectional view illustrating the regulator taken along the line IV-IV of FIG. 3.

FIG. 1 is a sectional side view illustrating a vehicle AC generator according to a first embodiment of the present invention, FIG. 2 is an electric circuit diagram of the vehicle AC generator of FIG. 1, FIG. 3 is a front view illustrating a regulator 13 of FIG. 1, and FIG. 4 is a sectional view illustrating the regulator 13 taken along the line IV-IV of FIG. 3. In FIGS. 3 and 4, the illustration of an insulating resin material is omitted.

The vehicle AC generator (hereinafter, referred to simply as a "generator") includes a front bracket 1, a rear bracket 2, a shaft 4, a claw-pole type rotor 5, a front fan 6, a rear fan 7, a slip ring 8, a pair of brushes 9, a stator core 10, a stator coil 11, a rectifier 12, a regulator 13, and a heat sink 14. The shaft 4 is provided inside the front bracket 1 and the rear bracket 2. A pulley 3 is mounted to one end of the shaft 4. The rotor 5 is mounted to the shaft 4. The front fan 6 is mounted on the front bracket 1 side of the rotor 5, whereas the rear fan 7 is mounted on the rear bracket 2 side of the rotor 5. The slip ring 8 is mounted to the shaft 4 and supplies a current to the rotor 5. The pair of brushes 9 slide against the slip ring 8. The stator core 10 is fixed to the front bracket 1 and the rear bracket 2. The stator coil 11 is obtained by winding a conductor around the stator core 10. The rectifier 12 is electrically connected to the stator coil 11 to rectify an AC generated by the stator coil 11 into a DC. The regulator 13 regulates an AC voltage generated by the stator coil 11. The heat sink 14, which is provided for cooling the regulator 13, is mounted to the regulator 13.

Figure 5:
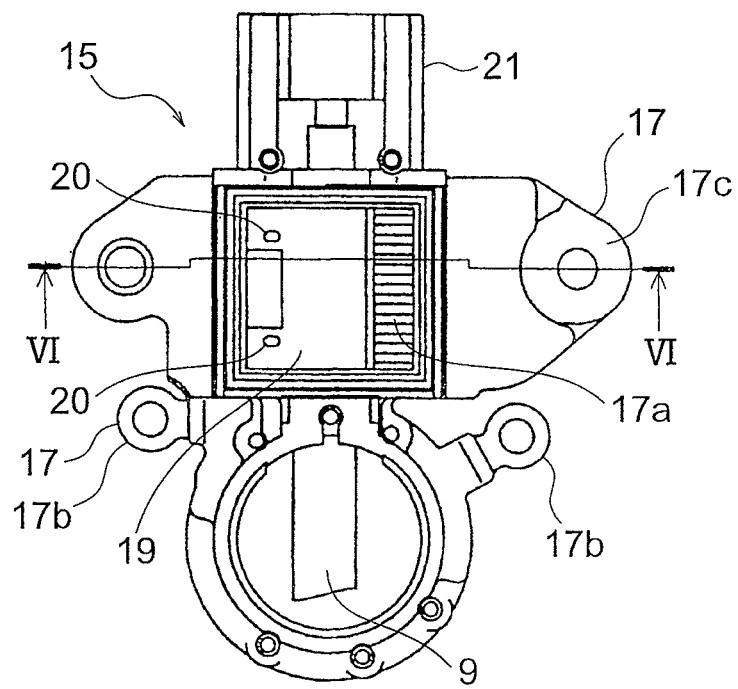
FIG. 5 is a front view illustrating a regulator holder of the regulator of FIG. 3.
Figure 6:
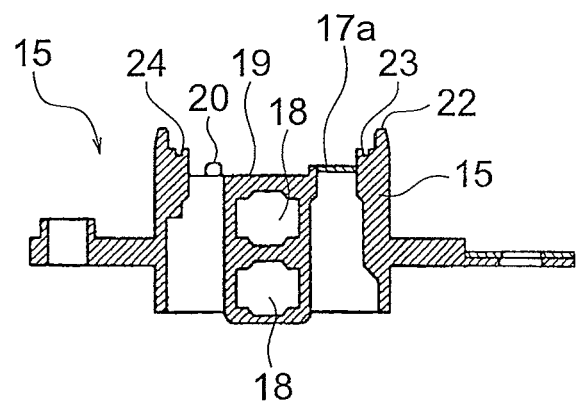
FIG. 6 is a sectional view illustrating the regulator holder taken along the line VI-VI of FIG. 5.
Figure 7:
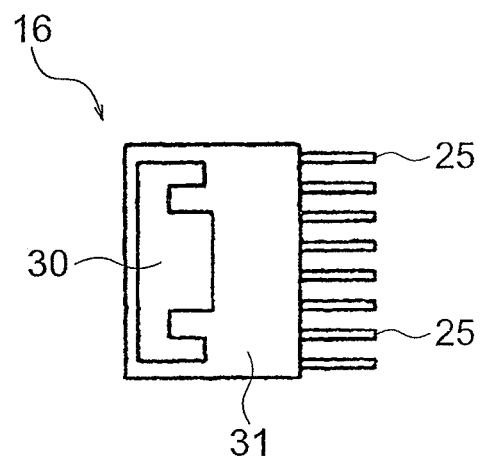
FIG. 7 is a plan view illustrating an IC regulator main body of FIG. 4.
Figure 8:
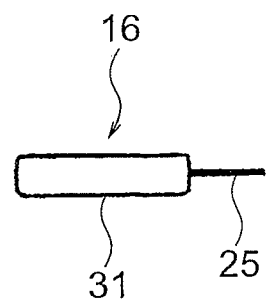
FIG. 8 is a side view illustrating the IC regulator main body of FIG. 7.

The regulator 13 includes a regulator holder 15 illustrated in FIGS. 5 and 6, an IC regulator main body 16 illustrated in FIGS. 7 and 8, a capacitor 50 for noise prevention, and an insulating resin material (not shown). The capacitor 50 absorbs a high-frequency noise which adversely affects a radio wave, which is generated when the AC is rectified into the DC by the rectifier 12. The insulating resin material fills an internal space of the regulator holder 15 to fix the IC regulator main body 16 and the capacitor 50 therein.

The IC regulator main body 16 corresponding to a regulator main body includes an IC chip portion 31 and a plurality of terminals 25. The IC chip portion 31 is integrally formed by molding. The plurality of terminals 25 extend unidirectionally from the IC chip portion 31.

The regulator holder 15, which is integrated with an insert terminal 17 by insert-molding, includes a pair of brush holes 18, a mount surface 19, projecting portions 20, and a connector portion 21. The brushes 9 are inserted into the pair of brush holes 18. On the mount surface 19, the IC regulator main body 16 is mounted. The projecting portions 20 are fitted into concave portions (not shown) of the IC regulator main body 16. The connector portion 21 is connected to a vehicle connector (not shown).

Figure 9:
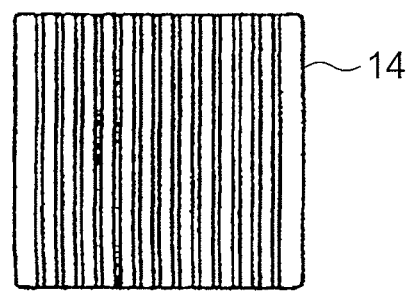
FIG. 9 is a plan view illustrating a heat sink of FIG. 4.
Figure 10:
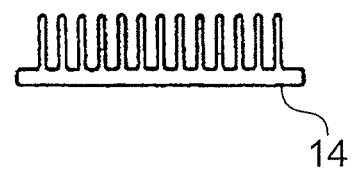
FIG. 10 is a side view illustrating the heat sink of FIG. 9.

The regulator holder 15 also includes an enclosure portion 22. The enclosure portion 22 surrounds an entire periphery of the mount surface 19 and has a level-difference portion 23. The level-difference portion 23 has a groove portion 24 formed thereon to extend over an entire periphery thereof. In addition, the heat sink 14 illustrated in FIGS. 9 and 10 is placed on the level-difference portion 23.

The insert terminal 17 includes a main-body connecting portion 17a, a connector connecting portion (not shown), a rectifier connecting portion 17b, a rear-bracket connecting portion 17c, and a capacitor connecting portion 17d (see FIG. 4). The main-body connecting portion 17a is exposed on the mount surface 19 and is electrically connected to the terminals 25 of the IC regulator main body 16. The connector connecting portion is exposed inside the connector portion 21. The rectifier connecting portion 17b is electrically connected to the rectifier 12. The rear-bracket connecting portion 17c is electrically connected to the rear bracket 2. The capacitor connecting portion 17d is electrically connected to a pair of terminals 51 of the capacitor 50.

In FIG. 2, a stator 60 and winding portions 61 are illustrated. The stator 60 includes the stator core 10 and the stator coil 11. The stator coil 11 is constituted by two three-phase AC windings, each being obtained by connecting the three winding portions 61 in a three-phase Y-configuration. A battery 26 and an electric load 62 are also illustrated in FIG. 2.

Although not illustrated in FIG. 2, the IC regulator main body 16 is electrically connected to an external on-vehicle device or the like through the terminals 25 in this embodiment.

In the generator having the aforementioned structure, the current is supplied from the battery 26 through the brushes 9 and the slip ring 8 to the rotor coil 27 of the rotor 5 to generate a magnetic flux. As a result, claw-like magnetic poles 28 of the rotor 5 are magnetized to an N-pole, whereas claw-like magnetic poles 29 of the rotor 5 are magnetized to an S-pole.

On the other hand, the pulley 3 is driven by an engine (not shown) and the rotor 5 is rotated by the shaft 4, and hence a rotating magnetic field is applied to the stator core 10. As a result, an electromotive force is generated in the stator coil 11.

The degree of the AC electromotive force is regulated by the regulator 13 which regulates the current flowing through the rotor 5.

After the AC generated by the AC electromotive force is rectified into the DC through the rectifier 12, the battery 26 is charged with the obtained DC.

The rectified current, that is, the DC obtained by the rectification flows through the capacitor 50. The capacitor 50 suppresses a steep commutating surge voltage generated at the time of rectification to absorb the high-frequency noise which adversely affects the radio wave.

Next, a procedure of fabrication of the regulator 13 of the generator having the aforementioned structure is described.

Figure 11:
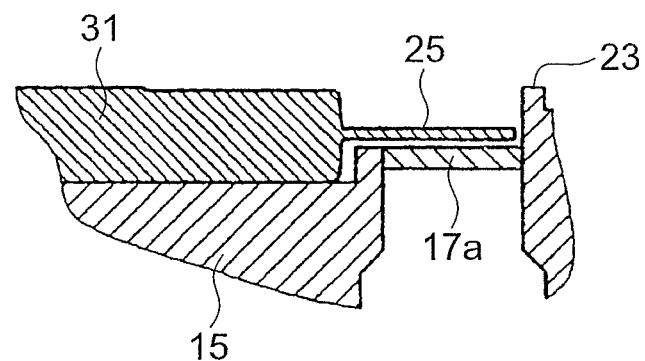
FIG. 11 is a sectional side view of a principal part of the vehicle AC generator, illustrating a step of assembling the vehicle AC generator of FIG. 1.

First, the concave portions of the IC regulator main body 16 are fitted to the projecting portions 20 provided on the mount surface 19 of the regulator holder 15 to place the IC regulator main body 16 on the mount surface 19. The terminals 25 of the IC regulator main body 16 are superposed on the main-body connecting portion 17a (see FIG. 11) to be fixed thereto by welding.

Figure 12:
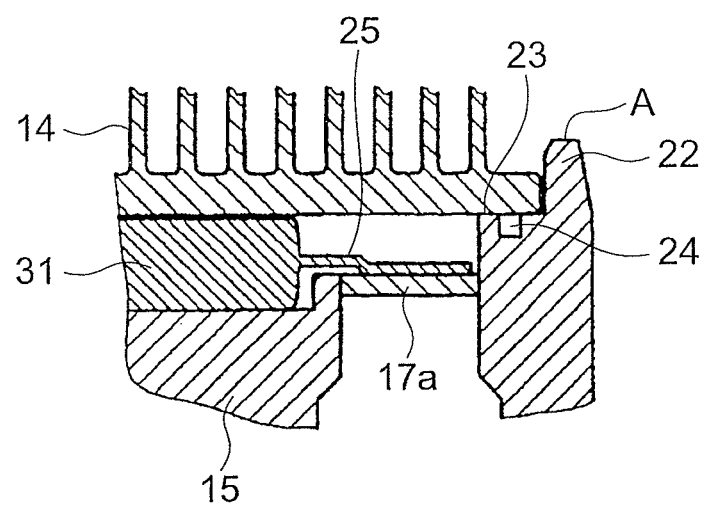
FIG. 12 is a sectional side view of the principal part of the vehicle AC generator, illustrating another step of assembling the vehicle AC generator of FIG. 1.

Next, a thermally conductive material is applied to a heat-generating portion 30 of the IC chip portion 31 of the IC regulator main body 16. The heat sink 14 is placed on the level-difference portion 23 of the enclosure portion 22 of the regulator holder 15 (see FIG. 12). Then, a distal end A of the enclosure portion 22 is bent inward to fix the heat sink 14 to the regulator holder 15.

Figure 13:
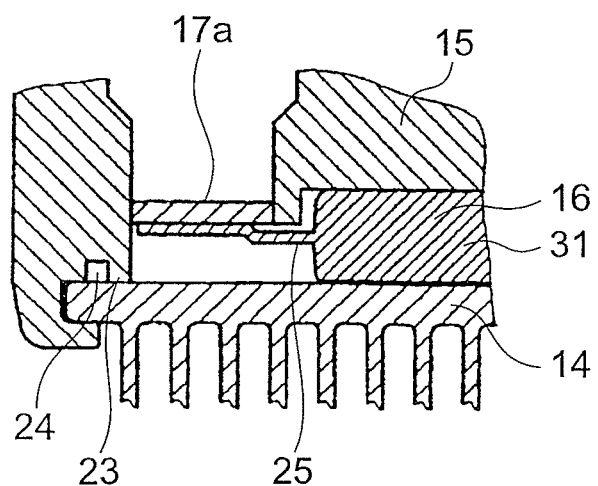
FIG. 13 is a sectional side view of the principal part of the vehicle AC generator, illustrating a further step of assembling the vehicle AC generator of FIG. 1.

After that, the regulator holder 15 is turned upside down (see FIG. 13). The terminals 51 of the capacitor 50 are bonded to the capacitor connecting portion 17d of the insert terminal 17 by welding (see FIG. 4).

Finally, the internal space of the regulator holder 15 is filled with an epoxy insulating resin material to fix the IC regulator main body 16 and the capacitor 50 therein.

The IC regulator main body 16 side and the capacitor 50 side of the regulator holder 15 are in communication with each other through the internal space of the regulator holder 15. Therefore, by injecting the insulating resin material from a part of an opening of the regulator holder 15, the entire internal space of the regulator holder 15 is filled with the insulating resin material.

According to the generator of this embodiment, the IC regulator main body 16 and the capacitor 50 are housed in the same regulator holder 15. Thus, the number of components is reduced.

Moreover, the IC regulator main body 16 and the capacitor 50 are simultaneously fixed with the insulating resin material which is injected from the opening of the regulator holder 15 to fill the internal space thereof. Thus, a fabrication time is reduced, while the IC regulator main body 16 and the capacitor 50 are protected with the insulating resin material to improve reliability.

Further, the regulator holder 15 includes the mount surface 19 on which the IC regulator main body 16 is mounted and the enclosure portion 22 which surrounds the IC regulator main body 16. The heat sink 14 which is in surface contact with the IC regulator main body 16 mounted on the mount surface 19 inside the enclosure portion 22 is fixed by the inwardly bent distal end A of the enclosure portion 22.

Therefore, the IC regulator main body 16 can be turned upside down before the IC regulator main body 16 and the heat sink 14 are connected by curing of the thermally conductive material which is present between the heat-generating portion 30 of the IC regulator main body 16 and the heat sink 14. By subsequently filling the regulator holder 15 with the insulating resin material, the thermally conductive material and the insulating resin material can be cured at the same time. As a result, the fabrication time can be further reduced.

Further, the heat sink 14 has not only a heat-releasing function but also a function as a bottom lid when the insulating resin material is injected into the internal space of the regulator holder 15.

Moreover, an area in which the terminals 25 of the IC regulator main body 16 are welded to the main-body connecting portion 17a of the insert terminal 17 (the area is also referred to as a "welding area") is separate away from a surface of the heat sink 14, which abuts against the IC regulator main body 16, as illustrated in FIG. 13. In addition, the entire periphery of the welding area is covered with the insulating resin material. Thus, the welding area is further prevented from being damaged.

Further, the enclosure portion 22 of the regulator holder 15 has the level-difference portion 23 on which the heat sink 14 is placed. Further, the groove portion 24 is formed in the level-difference portion 23 along the periphery of the heat sink 14. Thus, the insulating resin material filling the internal space of the regulator holder 15 hardly flows out from the regulator holder 15.

Second Embodiment

Figure 14:
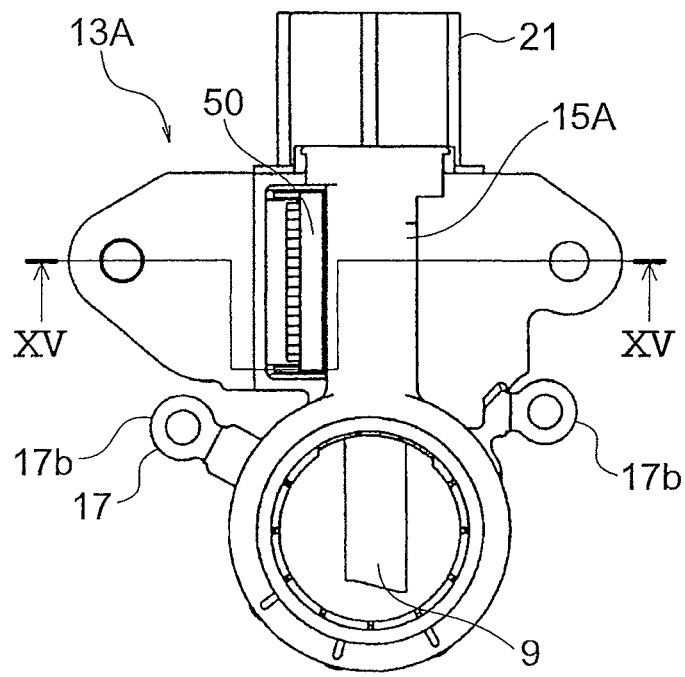
FIG. 14 is a front view illustrating a regulator of a vehicle AC generator according to a second embodiment of the present invention (insulating resin material is omitted here)
Figure 15:
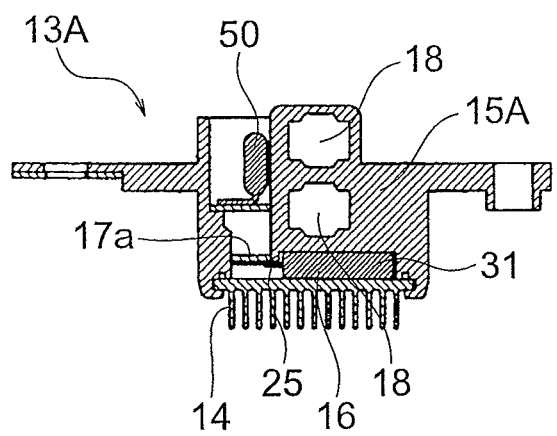
FIG. 15 is a sectional view illustrating the regulator taken along the line XV-XV of FIG. 14.

FIG. 14 is a front view illustrating a regulator 13A of the generator according to a second embodiment of the present invention, and FIG. 15 is a sectional view illustrating the regulator 13A taken along the line XV-XV of FIG. 14. In FIGS. 14 and 15, the illustration of the insulating resin material is omitted.

In the regulator 13 of the first embodiment, the area in which the terminals 25 of the IC regulator main body 16 and the main-body connecting portion 17a of the insert terminal 17 are welded to each other and an area in which the two terminals 51 of the capacitor 50 and the capacitor connecting portion 17d of the insert terminal 17 are welded to each other are separated away from each other with the brush holes 18 being interposed therebetween, as illustrated in FIG. 4.

On the other hand, in the regulator 13A of the second embodiment, the area in which the terminals 25 of the IC regulator main body 16 and the main-body connecting portion 17a of the insert terminal 17 are welded to each other and the area in which the pair of terminals 51 of the capacitor 50 and the capacitor connecting portion 17d of the insert terminal 17 are welded to each other are situated on the same side to be close to each other as illustrated in FIG. 15.

The remaining structure is the same as that of the generator of the first embodiment.

In comparison with the first embodiment, an internal space of a regulator holder 15A is small in this embodiment. Correspondingly, a smaller amount of the insulating resin material is sufficient to fill the internal space of the regulator holder 15A. Thus, the insulating resin material injected from an opening of the regulator holder 15A to fill the internal space thereof is cured within a correspondingly shorter period of time, thereby further reducing the fabrication time.

Although the regulators 13 and 13A of the generator, each including the brushes 9, have been described in the first and second embodiments, the present invention is also applicable to a regulator of a brushless generator.

Figure 16:
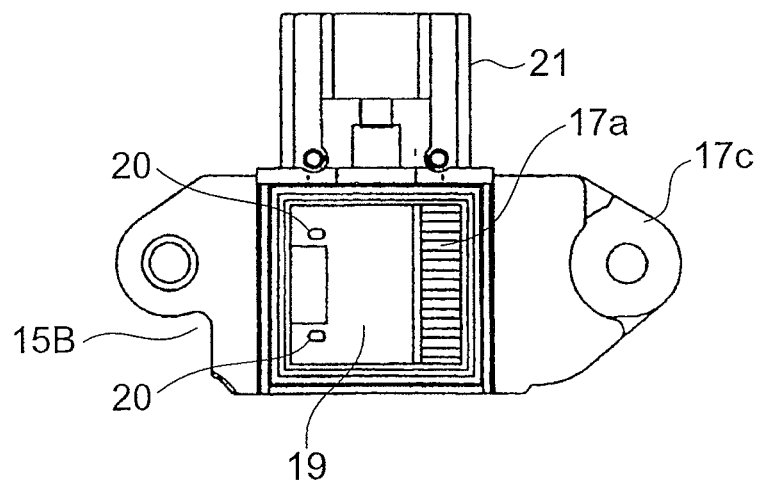
FIG. 16 is a front view illustrating a regulator holder of a regulator according to a modified example of the vehicle AC generator of the present invention.

FIG. 16 is a front view illustrating a regulator holder 15B of the regulator of the brushless generator.

Although the case where the mold-packaged IC regulator main body 16 obtained by integrally molding a voltage control circuit, an external circuit, and the like is used as the regulator main body has been described in each of the embodiments, it is apparent that the application of the present invention is not limited thereto. The present invention is also applicable to a regulator main body including, for example, an electronic circuit of a hybrid IC formed on one surface of a board.

What is claimed is:

1. A vehicle AC generator, comprising:
   a rectifier for rectifying an AC generated by a stator coil into a DC; and
   a regulator for regulating an AC voltage generated by the stator coil,
   wherein the regulator includes:
      a regulator holder;
      a regulator main body provided inside the regulator holder, the regulator main body being for regulating the AC voltage;
      a capacitor provided inside the regulator holder, the capacitor being for absorbing a noise generated when the AC is rectified into the DC by the rectifier; and
      an insulating resin material filling the regulator holder so as to fix the regulator main body and the capacitor.

2. A vehicle AC generator according to claim 1, wherein the regulator main body includes: an IC chip portion integrally formed by molding; and a plurality of terminals extending unidirectionally from the IC chip portion.

3. A vehicle AC generator according to claim 2, wherein:
   the regulator holder has a mount surface for mounting the IC regulator main body thereon and an enclosure portion for surrounding the IC regulator main body formed thereon; and
   the enclosure portion is provided with a heat sink in surface contact with the IC regulator main body mounted on the mount surface, the heat sink being fixed by an inwardly bent distal end of the enclosure portion.

4. A vehicle AC generator according to claim 3, wherein the enclosure portion of the regulator holder has a level-difference portion on which the heat sink is placed, and the level-difference portion has a groove portion formed along a periphery of the heat sink.

5. A vehicle AC generator according to claim 3, wherein:
   the regulator holder includes an insert terminal including an externally exposed main-body connecting portion to be electrically connected to the plurality of terminals of the IC regulator main body; and
   an area in which the plurality of terminals of the IC main body and the main-body connecting portion are welded to each other is separated away from a surface of the heat sink against which the IC regulator main body abuts.

6. A vehicle AC generator according to claim 5, wherein the area in which the plurality of terminals of the IC regulator main body and the insert terminal are welded to each other and an area in which a terminal of the capacitor and the insert terminal are welded to each other are situated on the same side inside the regulator holder.

* * * * *